United States Patent [19]

Sterling

[11] Patent Number: 5,359,706
[45] Date of Patent: Oct. 25, 1994

[54] IMAGE ROTATION USING BLOCK TRANSFERS

[76] Inventor: Thomas Sterling, 1715 Chandler Ave., Ann Arbor, Mich. 48105

[21] Appl. No.: 788,991

[22] Filed: Nov. 7, 1991

[51] Int. Cl.$^5$ ............................................. G06F 15/20
[52] U.S. Cl. .................................................. 395/137
[58] Field of Search ............... 395/137, 133, 164, 165; 382/46; 345/126

[56] References Cited

U.S. PATENT DOCUMENTS 4,829,452  5/1989  Kang et al. ...................... 364/518

*Primary Examiner*—Phu K. Nguyen
*Attorney, Agent, or Firm*—Reising, Ethington, Barnard, Perry & Milton

[57] ABSTRACT

A digital image is rotated clockwise, for example, by the steps of (1) dividing it into rectangular contiguous blocks, the center of any selected block being located to the left and down a half pixel from the center of a contiguous block to the right and being located to the right and up a half pixel from the center of a contiguous block on the left, and the center of said selected block being located above and to the left a half pixel from the center of a contiguous block below and located below and to the right a half pixel from the center of a contiguous block above and (2) rearranging the blocks so that the center of said selected block is located to the left and up a half pixel from the center of said contiguous block to the right and to the right and down a half pixel from the center of said contiguous block to the left, and the center of said selected block is located above and to the right a half pixel from the center of said block below and being located below and to the left a half pixel from the center of said block above.

6 Claims, 9 Drawing Sheets

IMAGE ROTATION USING BLOCK TRANSFERS

FIELD OF THE INVENTION

This invention relates to computer graphics and more particularly it relates to image rotation.

BACKGROUND OF THE INVENTION

In a graphics editing station images are entered into the system either through scanning originals, from video cameras or from operator input. The editing station can then create documents by arranging the images on the output pages.

For quality graphic editing, the operator should have the capability of rotating the image.

The obvious way to rotate an image is to store the original image in one area of memory and transferring each dot from one image to the other. The problem with this method is that, as the image is rotated, the dots from the original image will fall between the dot locations in the second area of memory. For this reason, interpolation should be applied to each dot. Using that approach, there must be a series of computations performed for each dot, which will result in low speed operation (or high cost). There is a need for a simplified, high speed algorithm for rotating images.

It is already known in the prior art to rotate a digital image through a small angle by partitioning the image into blocks and moving the blocks, as described in the Kang et al U.S. Pat. No. 4,829,452 issued May 9, 1989. In the method described, the image is divided into square blocks arranged in rows with each block exactly to the left or right of the other blocks in the same row; the image is also divided into columns with each block in a column being offset to the right by one pixel with respect to the next higher block. The rotation is accomplished by moving the lower rows to the left so that the columns are exactly vertical and by moving the rightmost columns in the downward direction so that each block is one pixel below the block to its left. The image may be rotated in the opposite direction by dividing the image so that each block in a column is offset to the left by one pixel then moving the lower rows to the right so that the columns are vertical and by moving the leftmost columns in the upward direction so that each block is one pixel above the block to its left.

A general object of this invention is to provide an improved method of rotating a digital image through an arbitrary angle using block moves of image data and to overcome certain disadvantages of the prior art.

SUMMARY OF THE INVENTION

In accordance with this invention, a method is provided for rotating a digital image through an arbitrary angle without need for interpolation. This is accomplished by partitioning a bitmap of the image in memory into blocks of various sizes arranged in rows and columns which are tilted at a predetermined angle in one direction. The blocks are then moved, block-for-block, to form rows and columns tilted in the opposite direction by the same predetermined angle. The block movement of data avoids need for interpolation and the image is rotated through the desired angle in memory by an algorithm which is relatively fast.

Further, in accordance with the invention, the image to be rotated is divided into blocks of image data, formed into rows and columns. These rows (and columns) are tilted at half the desired angle of rotation, relative to horizontal (or vertical) and away from the direction of the rotation. Each pair of neighboring blocks differs in size by one dot on the common side. The smaller block is always positioned to create the tilt. Now the rotation is accomplished by transferring each block of image information from the area of memory where it originally resided to a second area of memory where the new, rotated, image resides. The transfer is accomplished as follows. First, the first row of blocks is transferred by transferring it block-by-block, and placing each block to the right of the preceding one, but one dot lower relative to the preceding one. Second, each block in the second row is placed below its corresponding block in the first row, but one dot to the left. The result is a rotation of the image through the desired angle in one transfer of data. There is a certain amount of skewing of the data but each dot is within one dot width of the correct rotated position.

Further, in accordance with this invention, an image stored in memory is rotated by the steps of: (1) dividing the image into rectangular contiguous blocks, the center of any selected block being located to the left and down a half pixel from the center of a contiguous block to the right and being located to the right and up a half pixel from the center of a contiguous block on the left, and the center of said selected block being located above and to the left a half pixel from the center of a contiguous block below and located below and to the right a half pixel from the center of a contiguous block above, and (2) rearranging the blocks so that the center of said selected block is located to the left and up a half pixel from the center of said contiguous block to the right and to the right and down a half pixel from the center of said contiguous block to the left, and the center of said selected block is located above and to the right a half pixel from the center of said block below and being located below and to the left a half pixel from the center of said block above.

A complete understanding of this invention will be obtained from the detailed description that follows taken with the accompanying drawings.

BEST MODE FOR CARRYING OUT THE INVENTION

Figure 1:
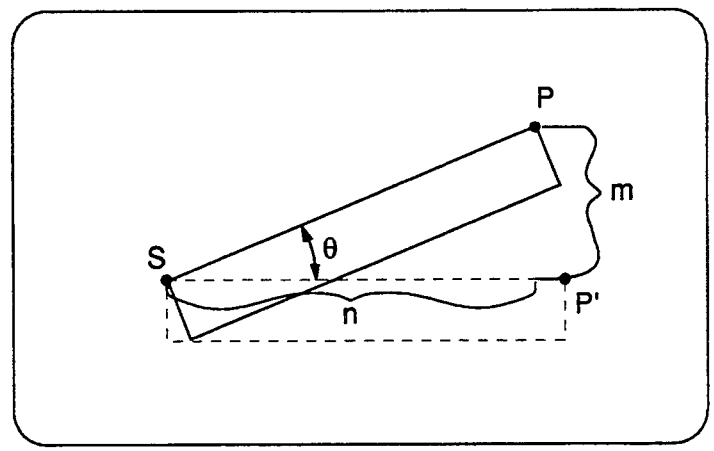
FIG. 1 is an example image on computer screen for explanatory purposes.

The invention will now be described with reference to an illustrative embodiment wherein a bitmapped image is rotated in memory through a selected angle less than forty-five degrees in either the clockwise or counterclockwise direction. The partitioning of the image for different angles of rotation is described for several examples. The movement of the blocks or tiles of the partitioned image is carried out in a computer memory under program control using a preferred algorithm. It will be appreciated as the description proceeds, that the invention may be realized in other embodiments and may be used in a wide variety of applications.

GENERAL DESCRIPTION OF THE ROTATION METHOD

A typical example of the need for rotation of an image by an arbitrary angle arises in case of digital storage of an image by digital scanning of a document, such as an engineering drawing. When the drawing is fed into the scanner, it may be more or less skewed and accordingly the digitized image as it is initially stored in memory will reflect the skewing of the document relative to the scanner. When the stored image is produced on the computer screen it will be skewed correspondingly, relative to the screen. It may be desirable to rotate the image as viewed on the screen to a desired alignment with the screen. Another example of the need for rotating an image arises in presenting the image on the computer screen or in a printed document at a rotational position different from that represented by its bitmapping in memory.

An image on a given medium, such as a display screen of a computer, is produced by an array of dots or picture elements (pixels). Whether the image is monochrome or color, each pixel is controlled by one or more binary bits stored in memory. In a bitmapped image, i.e. an image stored by bitmapping in memory, each pixel corresponds to a bit or set of bits in memory. The image is produced from memory by accessing bits corresponding to the multiple pixels in the same sequence as the pixels occur in the image.

In the simplest case of bitmapping a dichrome image, there is one bit for each pixel which is either black or white depending on the logic state of the bit. When a given bit is relocated in memory, there is a corresponding relocation of the corresponding picture element in the image. With this relationship between the pixels of the image and the storage location of the bits in memory, the array of pixels which make up the image may be regarded as a representation of the bitmapped memory for the purpose of depicting a relocation of a pixel or a block of pixels.

In the description that follows, the bitmapped image will be represented by an array of pixels which will be partitioned into rectangular areas containing one or more pixels and referred to herein as blocks. The blocks are to be moved relative to each other for the purpose of rotating the image. Movement of a pixel or block of pixels, is accomplished by moving the bit or bits which represent a pixel from its initial memory location to a different location which may have been occupied by the bit or bits representing a different pixel.

FIG. 1 depicts an image of an elongated rectangular member, in two dimensions, on a computer screen. The image of the member is tilted or skewed by an angle $\Theta$ relative to the horizontal access of the screen. The image is bitmapped in the computer memory and it is desired to present the image on the screen parallel to the horizontal axis. This will require rotating the image through an angle $\Theta$ in the clockwise direction. If the point S of the image is held stationary the point P of the image will have to be moved to the point P' to achieve the desired rotation. The angle $\Theta$ can be expressed as:

$$\theta = \arctan m/n \quad (1)$$

where: m is the vertical distance between point S and point P and n is the horizontal distance between point S and point P.

In the method of rotation of this invention, the bitmap of the image is partitioned into a number of various size blocks in an initial arrangement of rows and columns which are tilted from the horizontal and vertical, respectively. The tilt is such that a line drawn through the centers of the blocks in each row will be tilted at an angle equal to one-half the desired rotation angle $\Theta$. After the image is thus partitioned, it is rotated by moving the blocks to a final arrangement in which the rows and columns are tilted in the opposite direction. In this final arrangement, a line drawn through the centers of the blocks in each row is tilted in the opposite direction by one-half the desired rotation angle $\Theta$. Thus, the angular difference between the initial tilt of the lines and the final tilt is equal to the desired rotation angle $\Theta$.

First Example Of Image Rotation

Figure 2:
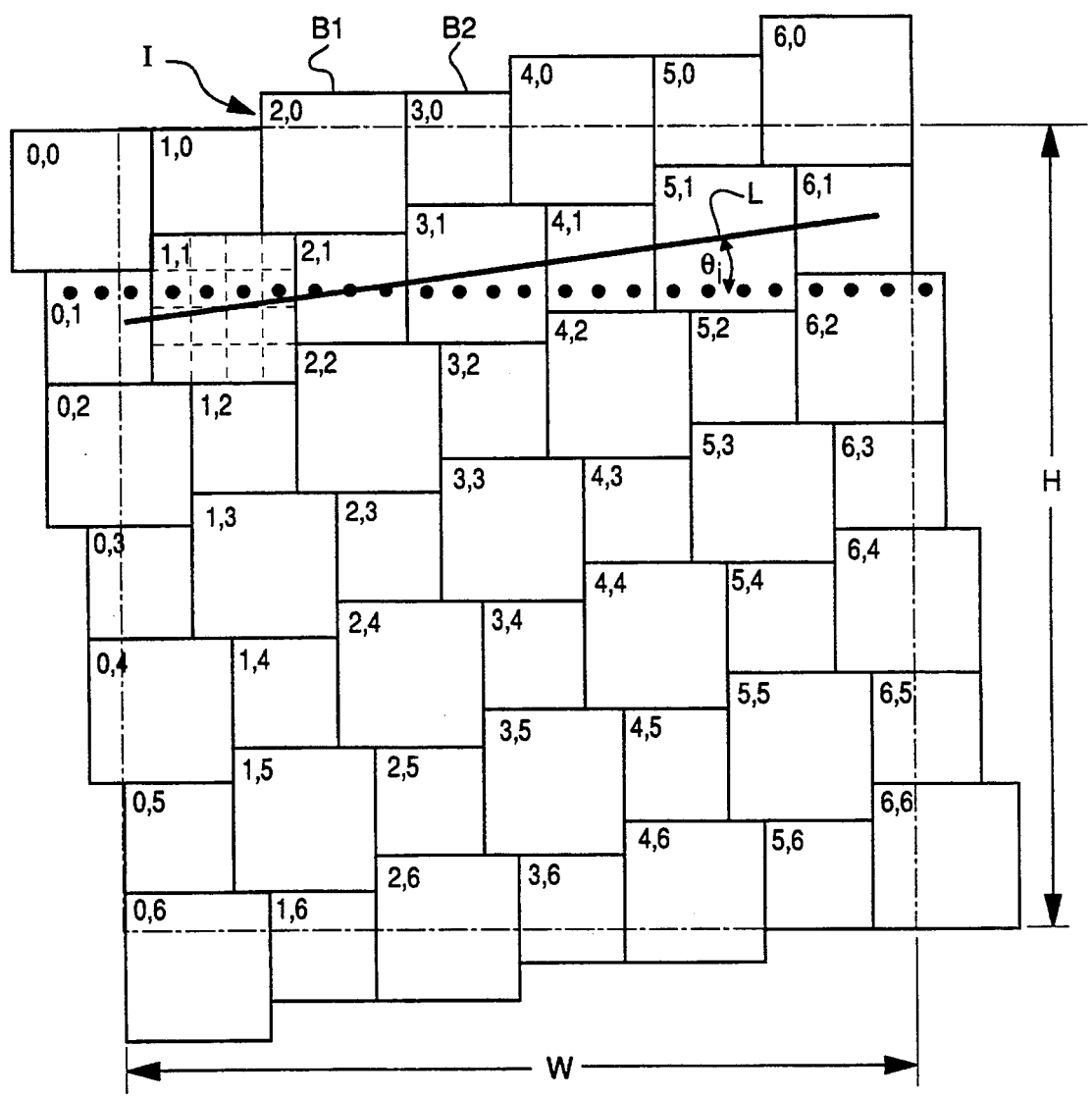
FIG. 2 is a diagram representing the partitioning of an image in preparation for rotation through a certain angle in the clockwise direction.
Figure 3:
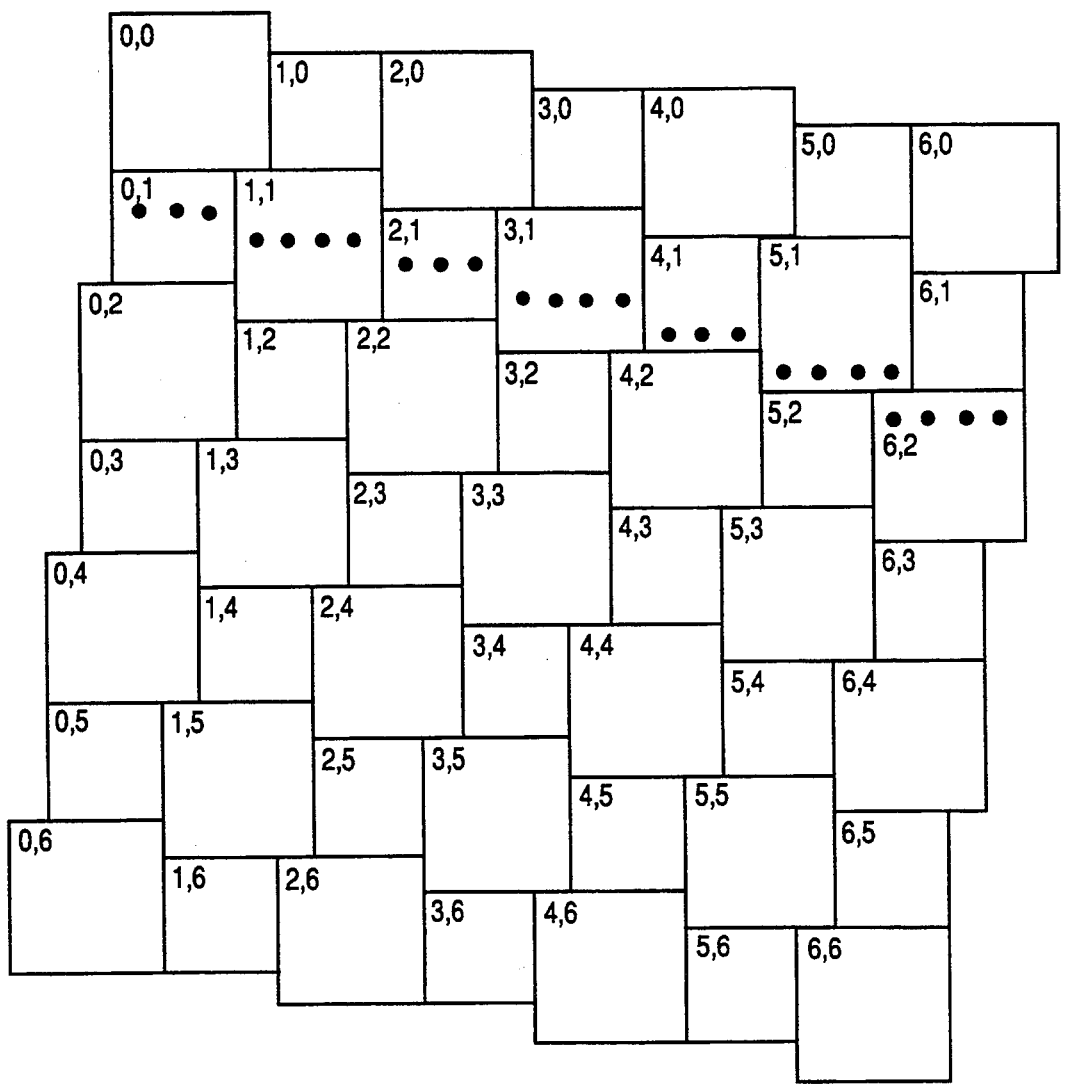
FIG. 3 is a diagram representing the partitioned image of FIG. 2 after rotation.

Before describing the image rotation process in detail for general application, it will be helpful to consider a specific example. Referring now to FIGS. 2 and 3, a first example of the invention will be described in which an image I is rotated through a selected angle. The image to be rotated is bitmapped in computer memory and is represented in FIG. 2 by a rectangular area within the interrupted lines, in its initial bitmapped location. The image I has a width of W pixels and a height of H pixels or scan lines. The image is partitioned into a plurality of rectangular blocks B of two different sizes, large blocks B1 and small blocks B2. All of the blocks are square and some are entirely within the boundaries of the image and some have portions lying outside of the boundary. The blocks are arranged in rows and columns which are skewed from the horizontal and vertical directions, respectively. Each block is designated by a pair of block numbers which represent the column number and row number, respectively. For example, the block designated 3,2 is located in column number three and row number two. In general notation, a block located in column "a" and row "b" is designated B (a,b).

In the image I, as depicted in FIG. 2, the large blocks B1 are four pixels wide and four pixels high and the small blocks B2 are three pixels wide and three pixels high. The pixels within a block are equally spaced as represented in block B(1,1) which is shown with a grid of squares, each square representing a pixel. In FIG. 2, the image is depicted in its non-rotated condition. This figure shows the pixels, represented by dots, of a single horizontal line, i.e. a scan line, of the image. It is noted that a line L extending through the centers of the blocks in a given row makes an initial tilt angle of $\Theta_i$ relative to the horizontal row of pixels. The initial tilt angle in the counterclockwise direction in FIG. 2 is: $\Theta_i = \arctan (1/n)$. The final tilt angle $\Theta_f$ in the rotated block pattern of FIG. 3 is $\Theta_f = -\arctan (1/n)$. In this example n =7.

The net image rotation angle, $\Theta$, is the algebraic sum of $\Theta_i$ and $\Theta_f$:

$$\theta = \theta_f - \theta_i = 2 \arctan (1/n) \quad (2)$$

which can be expressed as:

$$\theta = \arctan(2n/(n^2-1)) \quad (3)$$

For n=7, the angle $\Theta$ is:

$$\theta = \arctan(7/24) = 16.3 \text{ degrees} \quad (4)$$

Calculation Of Block Location And Size

For the purpose of rotating an image by any desired angle, it is necessary to provide a block pattern corresponding to the desired rotation angle $\Theta$. The rotation angle $\Theta$ is the sum of the initial tilt angle $\Theta_i$ and final tilt angle $\Theta_f$. The tilt angle is angle between the horizontal and the line, L, through the center of a row of blocks.

To make a block pattern for an image rotation angle $\Theta$, it is required to find two positive integers n and m, with n>m, which satisfy the following expression for the initial tilt angle $\Theta_i$:

$$\theta_i = -\arctan(m/n) \quad (5)$$

where:
 m = the x coordinate, expressed as a whole number of pixel units, of a point on line L,
 and
 n = the y coordinate of the point, expressed as a whole number of pixel units.

The location of any block can be determined, as follows, for a block pattern tilted counterclockwise. The upper left corner of any block B(a,b) (where a+b is even) has an x-coordinate $x_1(a,b)$ and a y-coordinate $y_u(a,b)$ given by the following formulae:

$$x_1(a,b) = [(an+bm)/2m] \quad (6)$$

$$y_u(a,b) = [(-am+bn+1)/2m] \quad (7)$$

where: the brackets denote truncation to the next lower whole number.

The size of the block B(a,b) can now be defined by determining the location of the lower and right sides. The lower and right sides have the same x and y coordinates as the adjoining sides of the contiguous blocks. The x coordinate of the right side $x_r(a,b)$ and the y coordinate of the lower side $y_1(a,b)$ are:

$$x_r(a,b) = x_1(a+1,b+1) \quad (8)$$

$$y_1(a,b) = y_u(a-1,b+1) \quad (9)$$

The bounds of a block for which a+b is odd can be determined from the four contiguous blocks which surround it and for which a+b is even. These bounds, denoted by the x coordinates $x'_1(a,b)$ and $x'_r(a,b)$ of the left and right sides and the y coordinates $y'_u(a,b)$ and $y'_1(a,b)$ of the upper and lower sides are as follows:

$$x'_1(a,b) = x_r(a-1,b) \quad (10)$$

$$y'_u(a,b) = y_1(a,b-1) \quad (11)$$

$$x'_r(a,b) = x_1(a+1,b) \quad (12)$$

$$y'_1(a,b) = y_u(a,b+1) \quad (13)$$

For a block pattern tilted clockwise the location and size of any block is determined in a similar way. The x and y coordinates of the upper left corner are represented by:

$$x_1(a,b) = [(an-bm)/2m] \quad (14)$$

$$y_u(a,b) = [(am+bn+1)/2m] \quad (15)$$

The lower and right sides are found by using the formula for the neighboring blocks:

$$x_r(a,b) = x_1(a+1,b-1) \quad (16)$$

$$y_1(a,b) = y_u(a+1,b+1) \quad (17)$$

The bounds of the blocks having a+b equal to an odd number are determined from the four blocks that surround it according to the following:

$$x'_1(a,b) = x_r(a-1,b) \quad (18)$$

$$y'_u(a,b) = y_1(a,b-1) \quad (19)$$

$$x'_r(a,b) = x_1(a+1,b) \quad (20)$$

$$y'_1(a,b) = y_u(a,b+1) \quad (21)$$

DESCRIPTION OF THE IMAGE ROTATION PROCESS

Figure 8A:
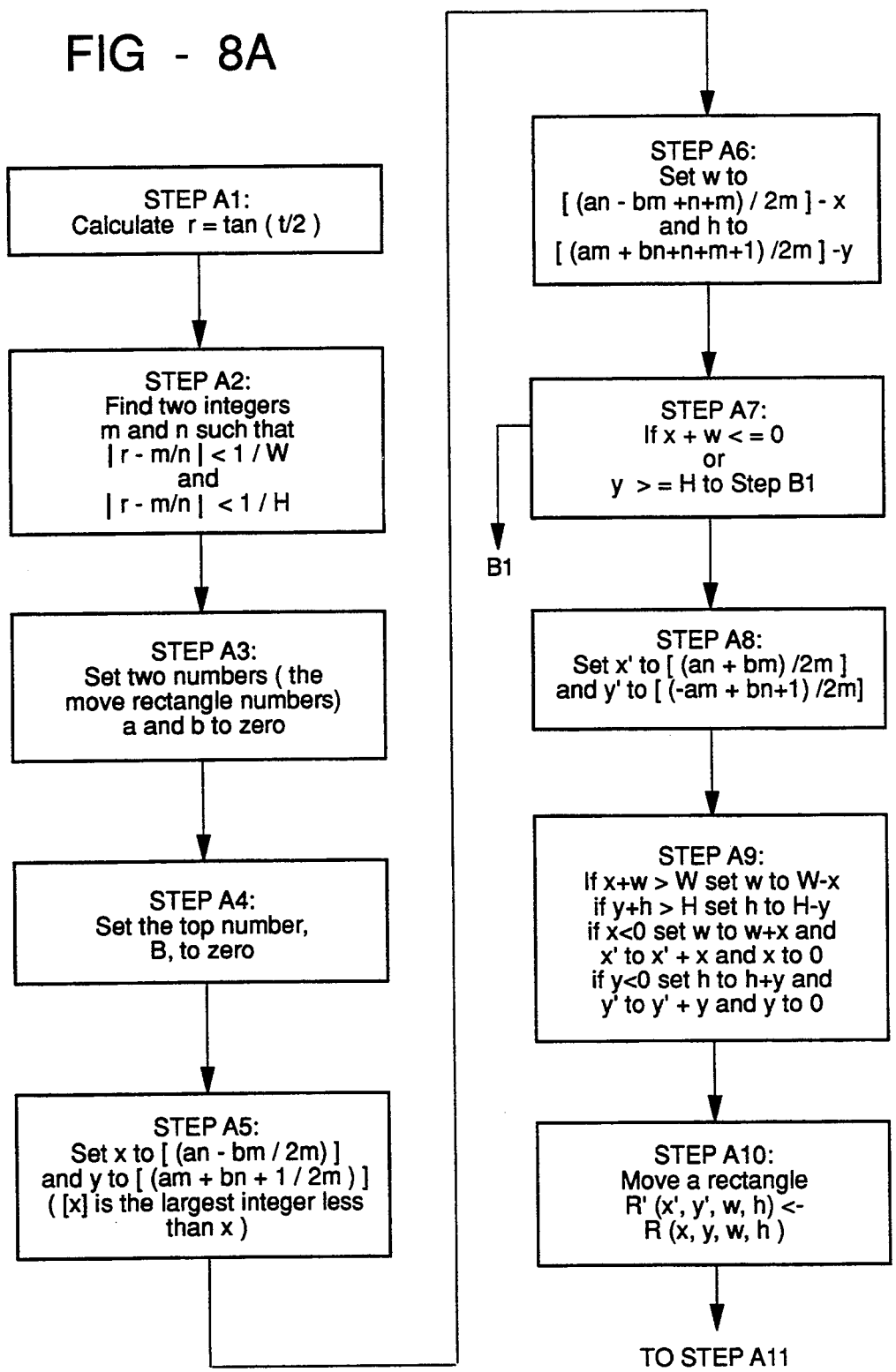
FIGS. 8A, 8B and 8C show a flow chart of a process for image rotation.
Figure 8B:
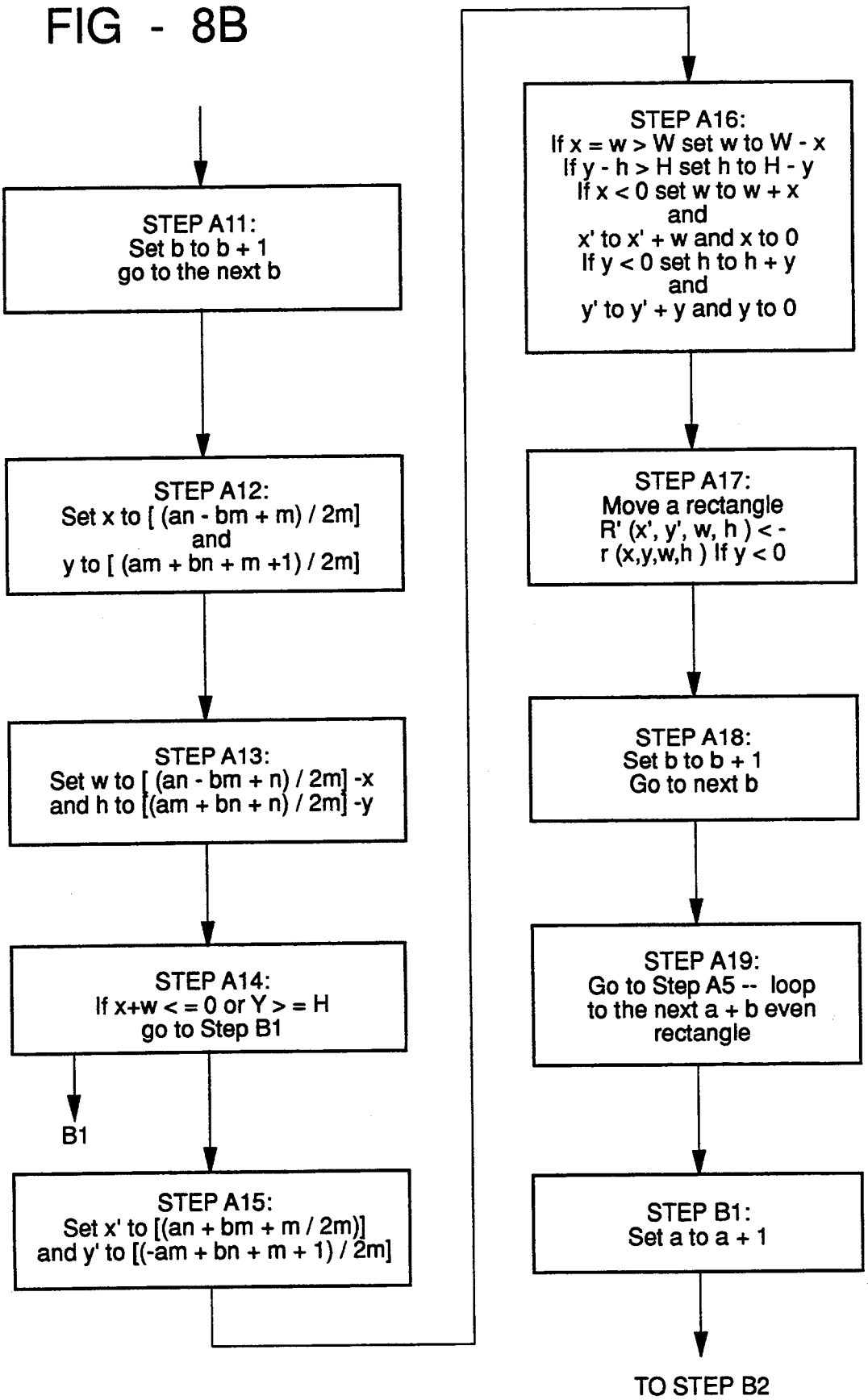
Figure 8C:
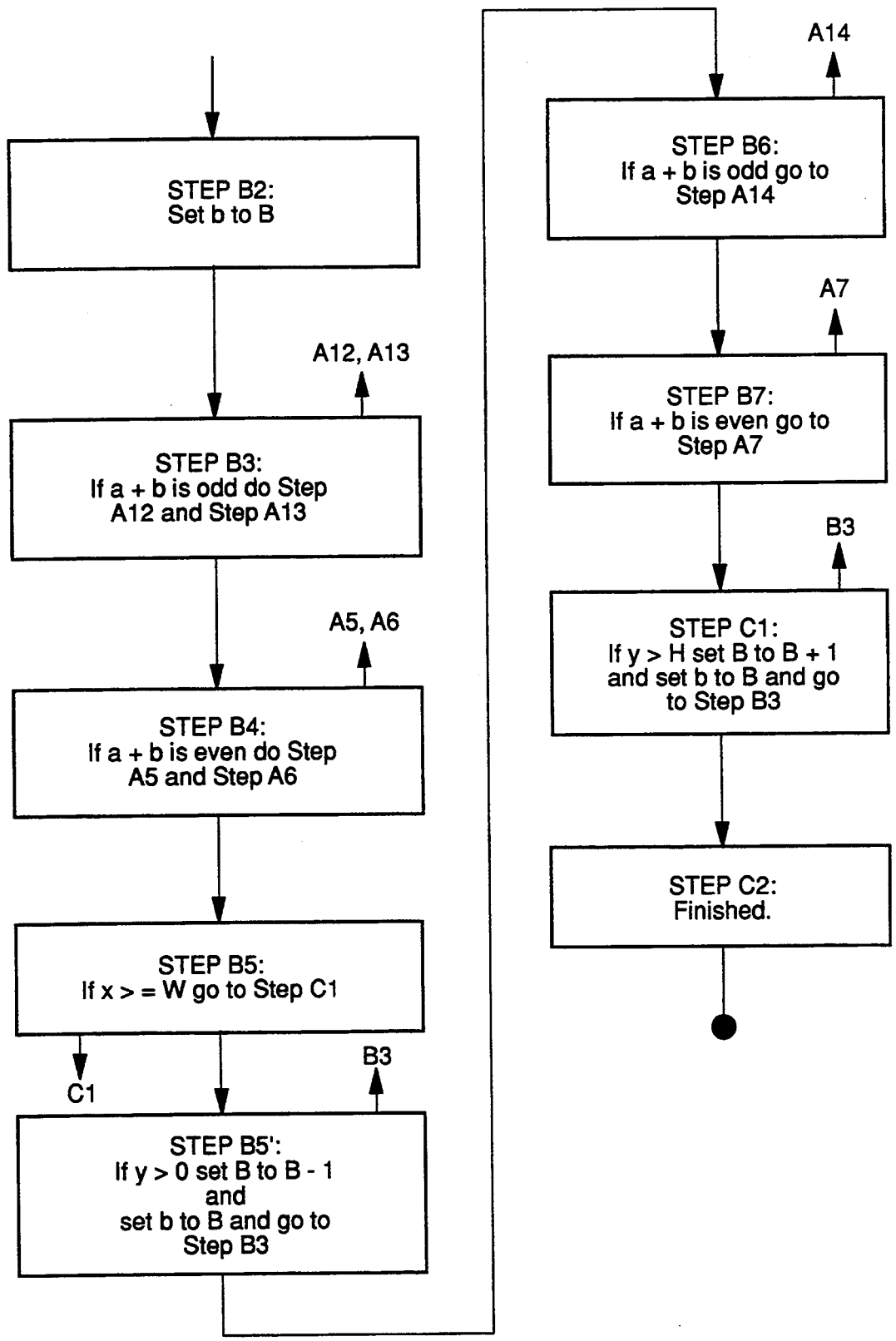

The process for rotating an image through the desired angle is preferably implemented in a computer program. This program and the algorithm embodied thereby is represented in the form of a flow chart of FIGS. 8A, 8B, and 8C which will be described presently.

As discussed above, the image to be rotated is bit-mapped in memory and is represented by an array of pixels. Such an array of pixels is represented as P(x,y) and is to be transformed to a new array of P'(x',y'), where x and y are the integer coordinates of each pixel. The new array will be the same image except for rotation through a desired angle from the initial array. A block in the array P can be specified by a point and by the width and height of the block, in the following form: B(x,y,w,h), where w and h are the width and height. Similarly, a block in the new array can be specified by: B'(x',y',w', h').

Moving a given block from the old array to the new array is denoted by:

$$B'(x',y',w,h) \leftarrow B(x,y,w,h) \quad (22)$$

Since the block is moved without change of size or form, the width and height of the moved block is the same as the width and height in the old array. Each pixel in the block B' of the new array is the same color as the corresponding pixel in the block B of the old array. For a point X',Y' in the block B' of the new array, the corresponding pixel in block B has the coordinates X,Y expressed as follows:

$$X = X' - x' + x \quad Y = Y' - y' + y \quad (23)$$

In the movement of the successive blocks, the block in the old array to be first processed is that specified by B (0,0,w,h). The angle of rotation will be set at $\Theta$, an arbitrary real number, which must be less than forty-five degrees.

The process for such rotation in the counterclockwise direction will now be described with reference to the flow chart of FIG. 8. The first step of the program, Step A1, calculates the value of r, which equals the tangent of one-half of the desired rotation angle, i.e.:

$$r = \tan(\Theta/2) \qquad (24)$$

Then Step A2 determines two integers m and n such that $$|r - m/n| < 1/W \qquad (25)$$

and $$|r - m/n| < 1/H \qquad (26)$$

for example, let n=W or n=H, whichever is larger. Then m=nr and this product is truncated to the nearest integer value.

Taken together, these expressions mean that the difference between the approximate m/n value and the actual tangent value is smaller than moving one pixel in the entire width of the image. This is required because the pixel can be moved only by a whole number of pixels, not by a fraction of a pixel. The movement of m pixels in the vertical direction at a distance of n pixels from the origin represents approximately one-half of the desired rotation angle $\Theta$.

Step A3 identifies the rectangle of the original array which is first to be moved. The selected rectangle is that one at the upper lefthand corner of the image. The coordinates a,b are set in Step A3 to 0,0.

In the process of rotation of the image, the rectangles of the initial array will be moved one at a time. The values of a and b will identify the block which is to be moved. The blocks will be identified and moved sequentially beginning with the block located in the first column and the first row, i.e. in the upper lefthand corner and specified as B(0,0,w,h). This will be followed by the block B'(0,1,w,h) which is in the first column and second row, and so on, down through the first column to the bottom of the image. Then, the next column will be processed in the same sequence followed by the processing of the succeeding columns until the entire initial array is processed. For this purpose, Step A4 sets a variable B to a value of zero. The value B will keep track of the value of b for a given row.

In this process, the image is being rotated in a counterclockwise direction. The first block being processed is B(0,0) and the sum of the coordinates is an even number. The next two steps, A5 and A6, calculate the position and size of the block identified by the current value of block numbers a and b. The position of the block is specified by the location of its upper left corner, (i.e. the pixel in the upper left corner) and its size is specified with additional information which specifies the location of the lower side and the right side of the block. The upper left corner of the block is specified by the Equations (14) and (15). The location of the right side of the block is the same as the location of the left side of a neighboring block which is contiguous to the right side and the X-axis coordinate of the block B(a,b), is given Equation (16). The lower side of the block a,b has the same location as the upper side of a neighboring block below and contiguous to it and the y coordinate $y_1(a,b)$ of the lower side of the block B(a,b) is given by Equation (17).

In Step A5, x is set to the value given by Equation (14) and y is set to the value given by Equation (15).

Then the program advances to Step A6 which sets the width w to the value given by:

$$w = [(an - bm + n + m)/2m] - x \qquad (27)$$

and it sets the height h to the value given by:

$$h = [(am + bn + n + m + 1)/2m] - y \qquad (28)$$

Next, the program checks to see whether the block is completely outside the image. This is done in Step A7 which checks to see whether the x coordinate of the upper lefthand corner of the block plus its width is less than zero, i.e. to the left of the first block. Step A7 also checks to see whether the y coordinate of the upper lefthand corner of the block is greater than or equal to the height of the block. If either is true, the program advances to Step B1 to decide if anything is left to be done.

Having calculated the position and size of the current block B(0,0,w,h), the next step is to calculate the position to which the current block is to be moved. As discussed above, the block in the new array is specified by B'(x',y',w',h'). As indicated in the flow chart, Step A8 sets x' and y' of the current block to values according to:

$$x' = [(an + bm)/2m] \qquad (29)$$

$$y' = [(-ym + bn + 1)/2m] \qquad (30)$$

Of course, the size of the block is not changed by the move so w' and h' remain equal to w and h, respectively.

After the block is moved, it may be partly off the image, especially in the case of border blocks. For this reason, Step A9 determines whether the moved block is wholly within the image and if it is not, the part outside the image is clipped.

Next, the program at Step A10 moves the block as indicated by the Equation (22). This completes the movement of the first block and the program then proceeds with the next block in the same column.

At Step A11, the value of b is incremented to select the next block for processing. The selected block is the block in column 1 row 2.

Then the program proceeds to Step A12 which locates the upper lefthand corner of the next block. (For this block, a+b is an odd number.) Step A13 then determines the width and the height of the block. Thus, the position and size of the block is determined.

Next, Step A14 determines whether the block is completely outside the image. If it is, the program advances to Step B1 to determine if anything is left to be done.

Step A15 calculates the position to which the current block is to be moved.

Step A16 determines whether the block is partly off the image and if it is, it is clipped.

Step A17 moves the current block to its new position.

At this point in the program, the block in the first column and first row (for which a+b is an even number) has been moved and also the block in the first column second row (for which a+b is an odd number) has been moved. The program will now proceed block-by-block through the successive rows of the first column by looping through Steps A5 through A19 until the block in the last row of the first column is moved.

For this purpose, Step A18 increments the value of B by one to select the block in the next row of the first column. Then, the program loops back repeatedly to Step A5 to move the remainder of the blocks in the first column.

After the last block of the row of the first column has been moved, the program advances to Step B1 which increments the value of "a" by one to process the next column.

In Step B2, the value of b is set to B, i.e. it is set to zero to keep track of the row of the block being processed.

In Step B3, it is determined whether a+b is odd and if it is, the program loops back and executes Steps A12 and A13. If it is not, the program advances to Step B4 which determines whether the sum of a and b is even and if it is, the program loops back to do Steps A5 and A6. Thus, the new block to be moved is calculated as to position and size, as described above.

Then, Step B5 determines whether the block is to the right of the image. If it is, the program advances to Step C1 to determine whether the block is not only to the right of the image but also above the image. If it is, the process is complete and the rotation of the image is complete. If Step C1 determines that the block is not above the image, the value of B is incremented and b is set equal to B and the program loops back to Step B3.

If at Step B5, it was determined that the block being processed is not to the right of the image the program proceeds to Step B5' which determines whether the block is the lowest in the image. If it is not, B is decremented by one and b is set equal to B and the program loops back to Step B3.

In Step B6, it is determined whether a+b is odd and if it is, the program loops back to Step A14. If it is not, the program advances to Step B7 which determines whether a+b is even. If it is, the program loops back to Step A7.

In Step C1, as discussed above, it is determined whether the current block is not only to the right of the image but also above the image. If it is not, the program loops back to Step B3 as already discussed. If it is, the process is finished and the rotation of the image is completed.

Second And Third Examples Of Image Rotation

Figure 4:
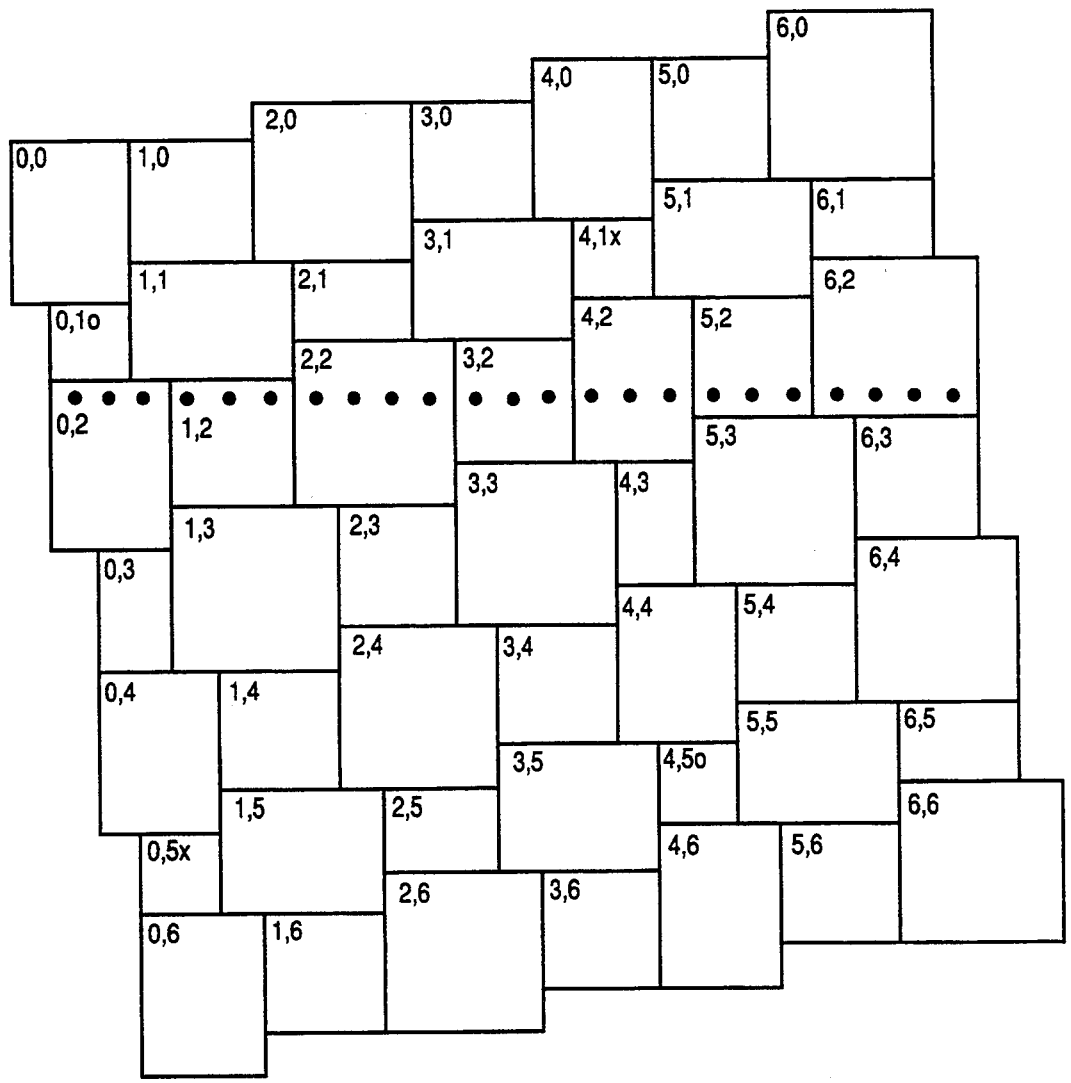
FIG. 4 is a diagram representing an image partitioned for a different angle of rotation.
Figure 5:
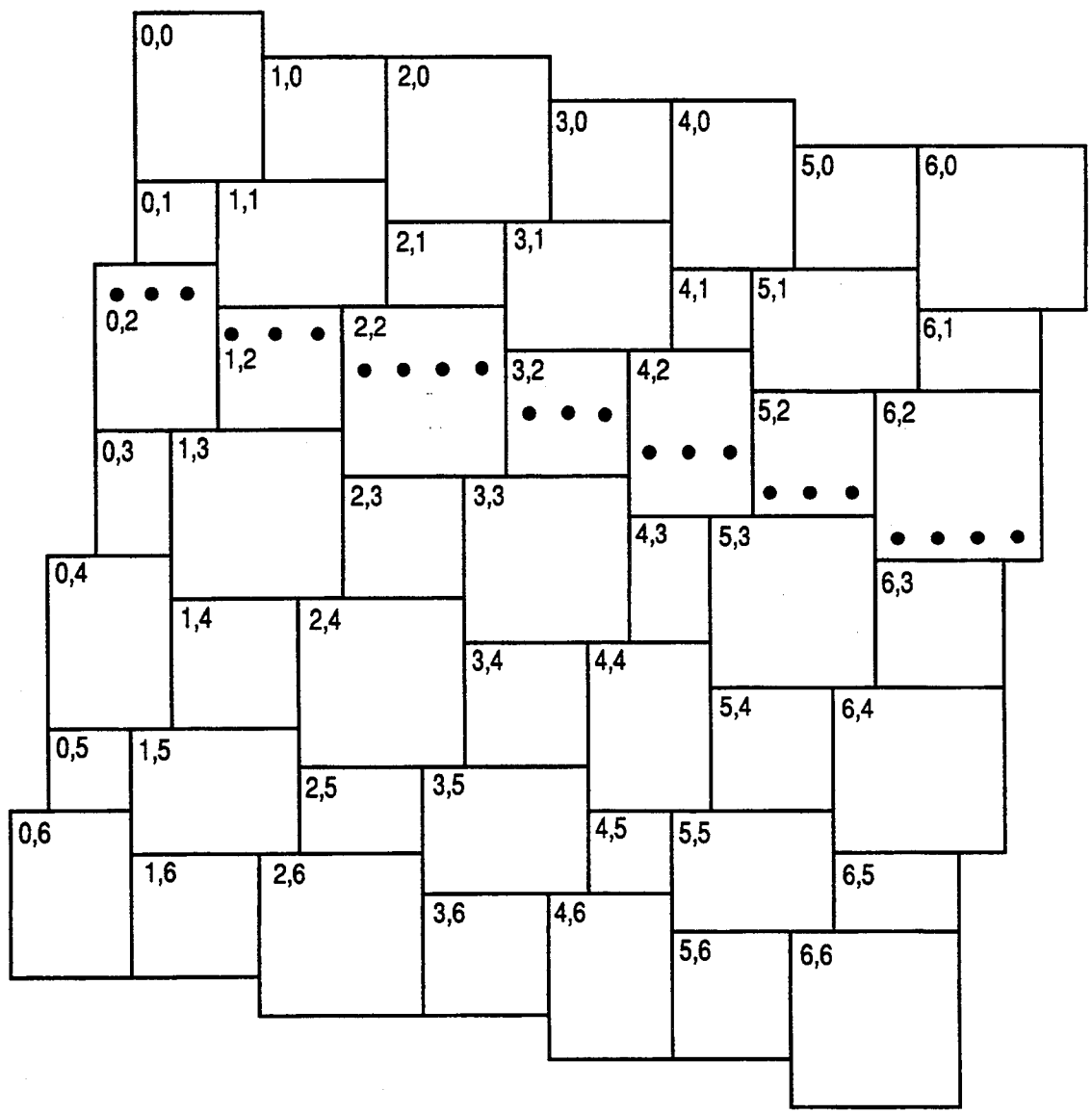
FIG. 5 is a diagram of the partitioned image of FIG. 4 after rotation.

As a second example, the block pattern for n=13 and m=2 is shown in FIGS. 4 and 5. The angle of rotation is given by:

$$\Theta = \Theta_f - \Theta_i = 2 \arctan (m/n) = \arctan 2nm/(n^2 - m^2) \quad (31)$$

This yields a rotation angle as follows:

$$\Theta = \arctan (52/165) = 17.4 \text{ degrees} \quad (32)$$

An anomoly arises in the case where n is less than 3 m which corresponds to an angle $\theta$ equal to or greater than approximately 36.87 degrees. In this case some of the blocks are degenerate and can have zero length on one or both sides. This causes some pixels to move by more than one pixel, relative to each other. This problem can be corrected by moving each of the pixels in exactly one block which adjoins the degenerate block and which has four pixels in a 2-by-2 array. Each pixel in this block is moved one pixel position in the direction of image rotation, i.e. clockwise or counterclockwise, as the case may be.

Figure 6:
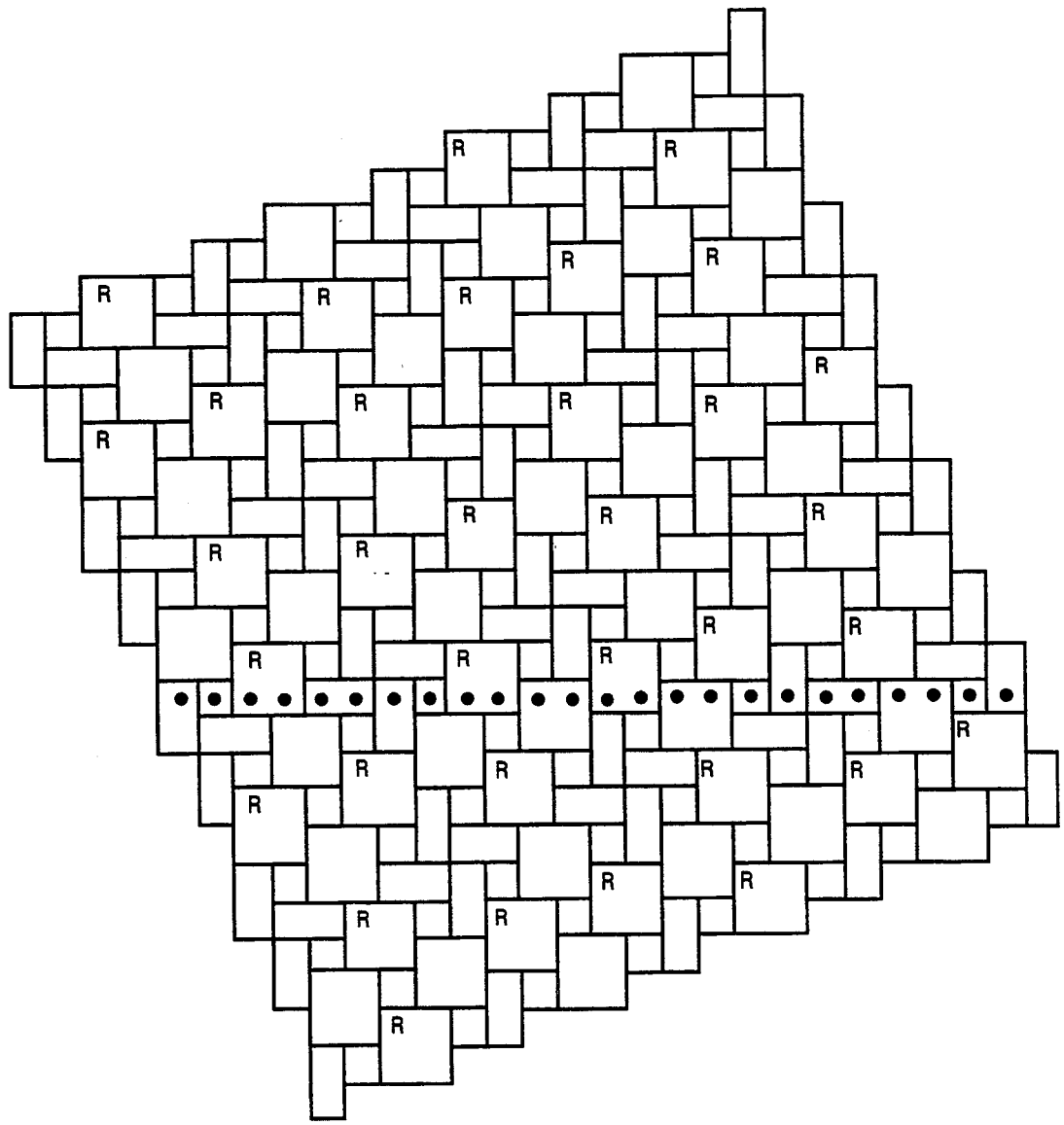
FIG. 6 is a diagram of a partitioned image for rotation through still another angle.
Figure 7:
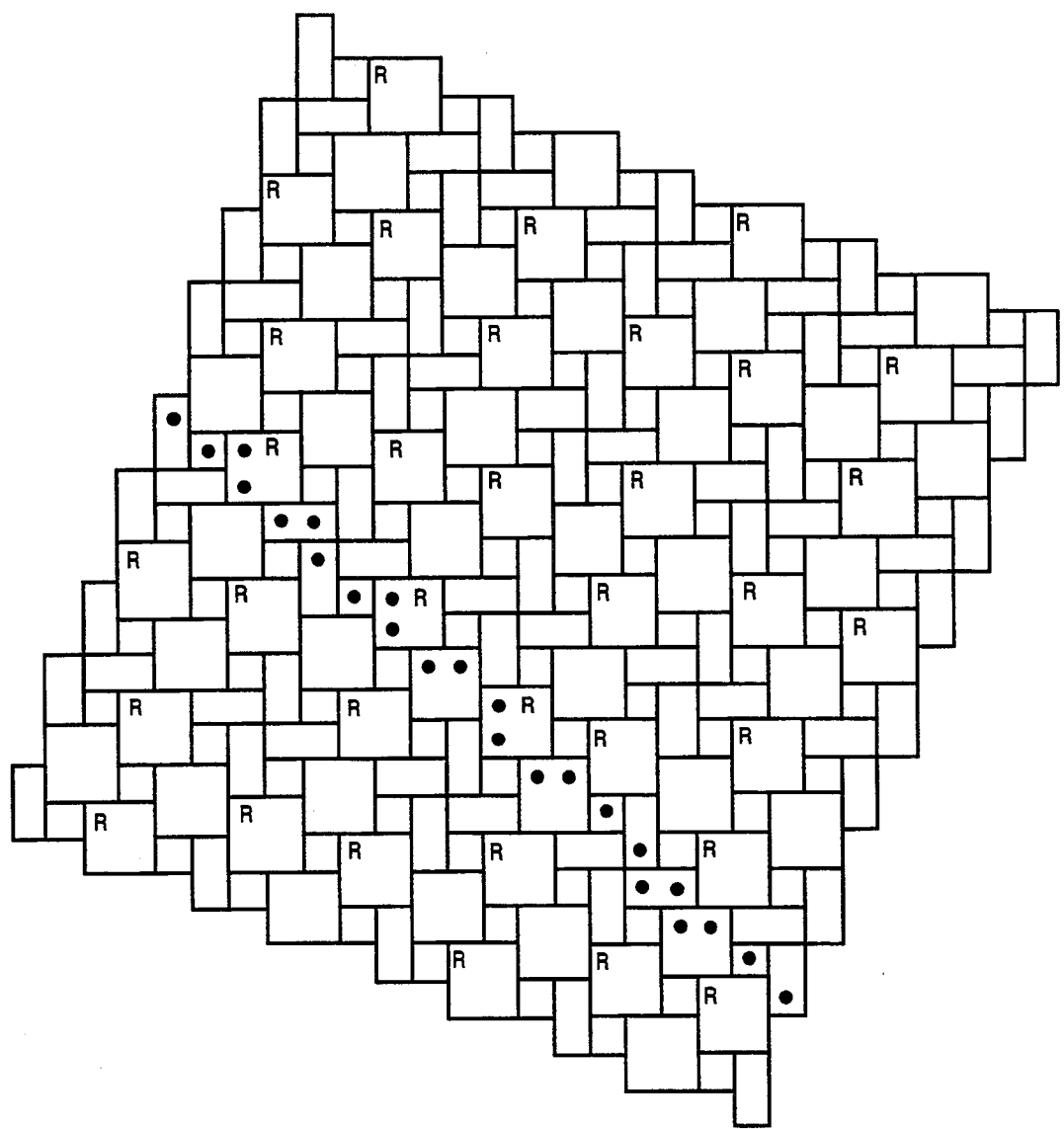
FIG. 7 is a diagram of the partitioned image of FIG. 6 after rotation.

As a third example, FIGS. 6 and 7 show the block pattern for n=5 and m=2. The blocks marked with an "R" are neighboring a degenerate block and should be rotated ninety degrees. The angle in this case is $$\Theta = \arctan (20/21) = 43.6 \text{ degrees} \quad (33)$$

which is close to forty-five degrees.

Although the description of this invention has been given with reference to a particular embodiment, it is not to be construed in the limiting sense. Many variations and modifications will now occur to those skilled in the art. For a definition of the invention, reference is made to the appended claims.

What is claimed is:

1. A method of rotating an image less than forty-five degrees in the clockwise direction said image being stored as digital bits in memory and representing a rectangular array of pixels, said method comprising the steps of:

dividing the image into rectangular contiguous blocks, the center of any selected block being located to the left and down a half pixel from the center of a contiguous block to the right and being located to the right and up a half pixel from the center of a contiguous block on the left, and the center of said selected block being located above and to the left a half pixel from the center of a contiguous block below and located below and to the right a half pixel from the center of a contiguous block above, and rearranging the blocks so that the center of said selected block is located to the left and up a half pixel from the center of said contiguous block to the right and to the right and down a half pixel from the center of said contiguous block to the left, and the center of said selected block is located above and to the right a half pixel from the center of said block below and is being located below and to the left a half pixel from the center of said block above.

2. The invention as defined in claim 1 wherein the said angle is greater than 36.87 degrees and wherein the step of dividing the image into rectangular contiguous blocks results in one or more blocks having zero length on one or both sides, said method including the following steps:

selecting one block which has a two-by-two pixel array and adjoins the degenerate block, and moving each of the pixels in the selected block in the clockwise direction.

3. A method of rotating an image less than forty-five degrees in the counterclockwise direction said image being stored as digital bits in memory representing a rectangular array of pixels, said method comprising the steps of:

dividing the image into rectangular contiguous blocks, the center of any selected block being located to the left and up a half pixel from the center of a contiguous block to the right and being located to the right and down a half pixel from the center of a contiguous block on the left, and the center of said selected block being located above and to the right a half pixel from the center of a contiguous block below and located below and to the left a half pixel from the center of a contiguous block above, and rearranging the blocks so that the center of said selected block is located to the left and down a half pixel from the center of said contiguous block to the right and to the right and up a half pixel from the center of said contiguous block to the left, and the center of said selected block is located above and to the left a half pixel from the center of said block below and is being located below and to the right a half pixel from the center of said block above.

4. The invention as defined in claim 3 wherein the said angle is greater than 36.87 degrees and wherein the step of dividing the image into rectangular contiguous blocks results in one or more blocks having zero length on one or both sides, said method including the following steps:

selecting one block which has a two-by-two pixel array and adjoins the degenerate block, and moving each of the pixels in the selected block in the counterclockwise direction.

5. A method of rotating an image less than forty-five degrees in a desired direction, the image being stored as digital bits in memory that represent a rectangular array of pixels, the method comprising the steps of:

dividing the image into contiguous blocks of plural sizes such that any selected one of said blocks is bordered by certain others of said blocks with some of said blocks lying along the periphery of the image and the remainder of said blocks lying within said periphery, the image being divided such that each side of any particular one of the largest of said remainder of said blocks borders two others of said blocks, and rearranging said blocks so that said selected one of said blocks remains contiguous with said certain others of said blocks, said rearranging being accomplished by shifting said certain others of said blocks by one pixel in the direction of desired rotation relative to said selected one of said blocks.

6. The invention as defined in claim 5, wherein said angle is greater than 36.87 degrees and further comprising the steps of:

identifying each of said largest of said blocks as being in either a first or a second group such that no two blocks within the same group border one another, and rotating each of said blocks within said first group about its center by ninety degrees in the direction of desired rotation.

* * * * *

UNITED STATES PATENT AND TRADEMARK OFFICE
CERTIFICATE OF CORRECTION

PATENT NO. : 5,359,706
DATED : October 25, 1994
INVENTOR(S) : Thomas Sterling

It is certified that error appears in the above-identified patent and that said Letters Patent is hereby corrected as shown below:

Column 6, line 20, delete "$x'_4(a,b)$" and insert -- $x'_r(a,b)$ --.

Column 8, line 30, delete "$y' = [ (-ym + bn + 1)/2m]$" and insert -- $y' = [(-am + bn + 1)/2m]$ --.

Signed and Sealed this

Thirtieth Day of July, 1996

Attest:

Attesting Officer

BRUCE LEHMAN

Commissioner of Patents and Trademarks